United States Patent

Hill

[15] 3,656,670
[45] Apr. 18, 1972

[54] MOTORCYCLE SUPPORT
[72] Inventor: Eugene Hill, 215 North High Street, Antlers, Okla. 74523
[22] Filed: June 30, 1970
[21] Appl. No.: 51,068

[52] U.S. Cl. .................................. 224/42.45 R, 224/42.03 B
[51] Int. Cl. ........................................ B60r 9/02, B60r 11/00
[58] Field of Search .................... 224/42.03 B, 42.21, 42.38, 224/42.45; 214/450, 451, 454; 280/179

[56] References Cited

UNITED STATES PATENTS

| | | | |
|---|---|---|---|
| 3,275,206 | 9/1966 | Croft | 224/42.03 B |
| 3,528,578 | 9/1970 | Schoenberger | 214/450 |
| 2,680,544 | 6/1954 | Hunt, Sr. et al | 224/42.45 |
| 3,521,774 | 7/1970 | Raypholtz | 214/450 |
| 2,772,826 | 12/1956 | Krengel | 224/42.24 |

Primary Examiner—Gerald M. Forlenza
Assistant Examiner—Lawrence J. Oresky
Attorney—Victor J. Evans and Co.

[57] ABSTRACT

The present invention relates to a motorcycle support in which a bracket is detachably secured to the top edge of the side of a pick-up body and an adjustable member projects inwardly therefrom. The adjustable member engages the side of the motorcycle tire and straps secured to the adjustable member encompass the tire to secure the motorcycle tire and wheel thereto. A pair of supports are required for securing a motorcycle in a pick-up truck body.

4 Claims, 3 Drawing Figures

PATENTED APR 18 1972  3,656,670

INVENTOR.
EUGENE HILL
BY Victor J. Evans & Co.
ATTORNEYS.

MOTORCYCLE SUPPORT

BACKGROUND OF THE INVENTION

Field of the Invention

The present invention relates to supports for motor-cycles for carrying the motorcycles in a pick-up truck body.

SUMMARY OF THE INVENTION

The present invention includes a bracket which is clamped to the flange formed along the top edge of a pick-up truck body side wall. An adjustable member is carried by the bracket and extends outwardly therefrom to engage the tire of a motorcycle. Straps carried by the adjustable member encompass the motorcycle wheel and tire securing the motorcycle tire to the adjustable member. One support being used for the front wheel and a second one for the rear wheel of the motorcycle.

The primary object of the invention is to provide a support for a motorcycle to permit the motorcycle to be carried in a pick-up truck body in erect position ready for use.

Other objects and advantages will become apparent in the following specification when considered in the light of the attached drawings.

DESCRIPTION OF THE PREFERRED EMBODIMENT

Figure 1:
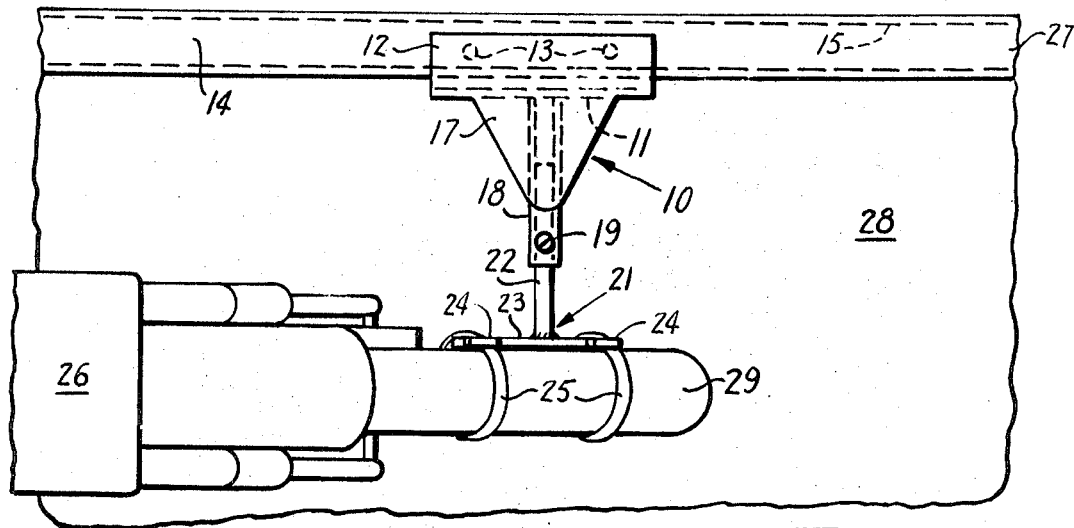
FIG. 1 is a top plan view of the invention with the pick-up truck body and motorcycle shown partially broken away for convenience of illustration.
Figure 2:
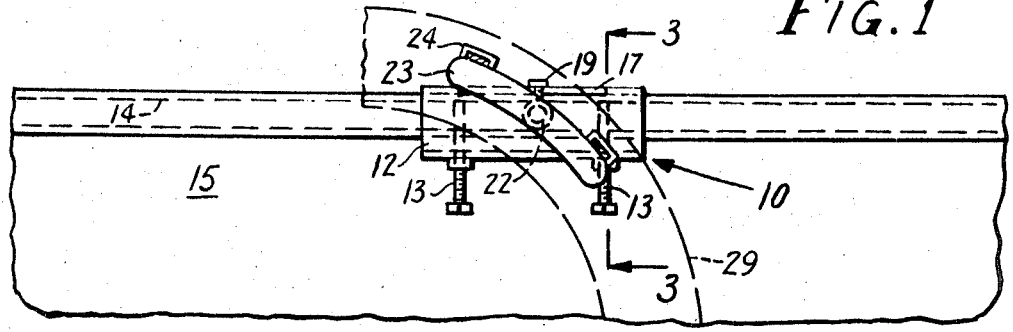
FIG. 2 is a side elevation of the invention with the pick-up truck body shown partially broken away for convenience of illustration.

Referring now to the drawings in detail wherein like reference characters indicate like parts throughout the several figures the reference numeral 10 indicates generally a motorcycle support constructed in accordance with the invention.

The motorcycle support 10 includes a bracket 11 formed from an elongate U-shaped channel member 12 arranged with the open side thereof to the outside. A pair of clamp bolts 13 are threaded up through one side of the channel 12 toward the other side thereof as can be best seen in FIG. 3 to clamp the flange 14 on the pick-up side wall 15 therebetween. A locknut 16 on the bolt 13 prevents the bolt 13 from loosening after being tightened on the flange 14.

The bracket 11 includes a generally horizontal triangular plate 17 welded to the channel member 12 and arranged in aligned relation to the upper side wall thereof. A hollow tube 18 extends from the channel 12 outwardly in contact with the plate 17 to a point beyond the plate 17. The tube 18 is welded to the channel 12 and to the plate 17 to form an integral structure.

A clamp bolt 19 is threaded through the tube 18 adjacent the outer end thereof and a locknut 20 is threaded onto the clamp bolt 19 to prevent the clamp bolt 19 from loosening after it has been tightened.

Figure 3:
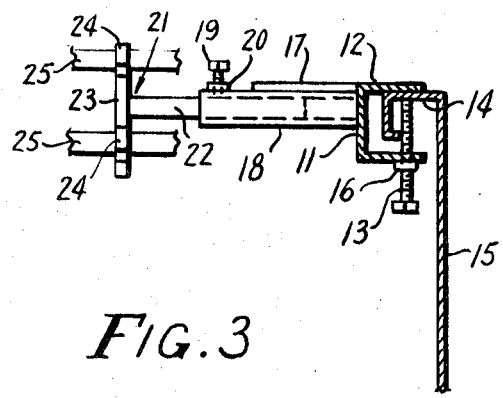
FIG. 3 is a transverse cross section taken along the line 3—3 of FIG. 2 looking in the direction of the arrows.

An adjustable member 21 has a rod 22 extending horizontally into the tube 18 in telescoping relation thereto. The rod 22 is clamped in adjusted position with respect to the tube 18 by the clamp bolt 19. A slightly arcuate plate 23 is welded to the upper end of the rod 22 in a substantially T formation as can be seen in FIGS. 1 and 3. Strap loops 24 are welded to the plate 23 and binding straps 25 are threaded through the loops 24.

In the use and operation of the invention a motorcycle 26 is rolled into a pick-up body 27 supported on the floor 28 thereof. The motorcycle 26 is positioned adjacent a pair of the supports 10 with the plates 23 in engagement with the front and the rear wheels 29 of the motorcycle 26. The rod 22 is adjusted in the tube 18 to space the motorcycle 26 the desired distance from the side wall 15 of the pick-up 27. The straps 25 are then threaded through the spokes of the wheels 29 and secured together about the wheel 29 to secure the wheel 29 tightly to the plate 23 so that the motorcycle 26 is supported in erect position on the floor 28 of the pick-up 27 ready for use by merely disconnecting the four straps 25.

Having thus described the preferred embodiment of the invention it should be understood that numerous structural modifications and adaptations may be resorted to without departing from the spirit of the invention.

What is claimed is:

1. A motorcycle support for supporting a motorcycle in upright position in a pick-up truck body of the type having side walls carrying a generally horizontal flange at the top edge thereof, comprising a bracket, means detachably securing said bracket to the flange on said pick-up body side wall, a plate, means detachably securing said plate to the wheel of a motorcycle, means on said bracket mounting said plate for horizontal adjustment with respect to said pick-up side wall, said bracket including a generally horizontal channel member encompassing said flange, said bracket including a generally horizontal tube extending perpendicularly of said channel member oppositely of said flange, a generally triangular brace plate extending horizontally from the top edge of said channel member in engagement with said tube and integrally secured to said channel member and said tube.

2. A device as claimed in claim 1 wherein the means for adjustably securing said plate to said bracket includes a rod telescopically mounted in said tube and a clamp bolt extending through said tube for clamping said rod in said tube.

3. A device as claimed in claim 2 wherein the means for securing said plate to said motorcycle wheel includes a pair of straps mounted on opposite ends of said plate for encompassing said wheel.

4. A device as claimed in claim 1 wherein the means for securing said plate to said motorcycle wheel includes a pair of straps mounted on opposite ends of said plate for encompassing said wheel.

* * * * *